Sept. 7, 1926. Re. 16,418

H. NYE

BALL AND PROCESS FOR MAKING SAME

Original Filed Jan. 12. 1922

INVENTOR

Harry Nye,

BY R. O. Thorpe

ATTORNEY

Reissued Sept. 7, 1926. Re. 16,418

UNITED STATES PATENT OFFICE.

HARRY NYE, OF AKRON, OHIO.

BALL AND PROCESS FOR MAKING SAME.

Original No. 1,458,776, dated June 12, 1923, Serial No. 528,610, filed January 12, 1922. Application for reissue filed May 13, 1925. Serial No. 30,121.

It is among the objects of my invention to produce a ball that may be easily and cheaply manufactured, and which will resist hard usage and effects of the elements. The ball is particularly adapated for use in the game of base ball.

In the drawings, which show one manner of practicing the invention:

Figure 1:
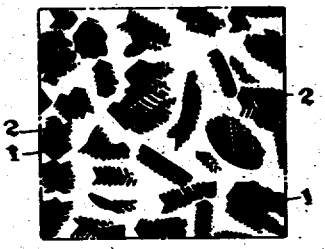
Figure 1 is a diagrammatic view of the material from which the body of the ball is made.

This ball is preferably made from stock for tires and is ordinarily composed of about equal parts of rubber and fabric diagrammatically illustrated in Figure 1, the rubber being designated 1 and the fabric 2. These materials are reduced to a pulp-like mass in any suitable manner as by grinding and moistening. The exact manner in which this pulp-like mass is prepared is immaterial so far as my invention is concerned.

The materials 1 and 2 may be scrap or trimmings from tire stock, which includes a high grade of rubber and cotton fabric.

Figure 2:
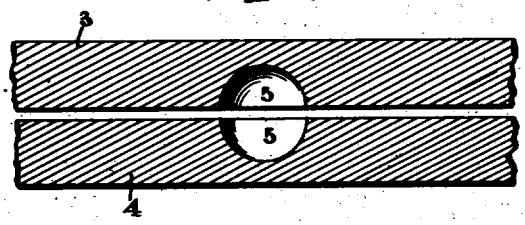
Figure 2 is a partial sectional view of a conventional mold.
Figure 3:
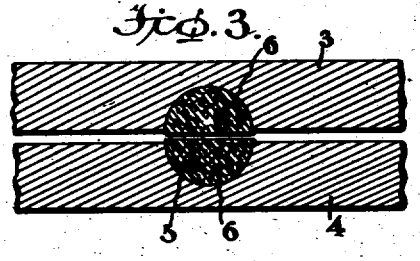
Figure 3 is a similar view with material in place for treatment.
Figure 4:
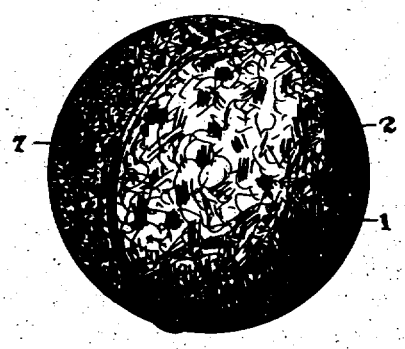
Figure 4 is a perspective view of the ball after the first and partial curing.

A conventional mold is shown in Figure 2 as comprising upper and lower plate members 3 and 4 with registering hemispherical cavities 5 therein. An excess of the pulp-like material is placed in the molds 3, 4, as indicated at 6 in Figure 3. The parts of the mold are pressed together and subjected to heat, which operation can readily be performed in a vulcanizing press. This first heating is carried far enough to cement the pulp-like mass together and effect a partial cure. The ball 7 then has the appearance shown in Figure 4, the joining line being evident but the two parts being firmly held together.

Figure 5:
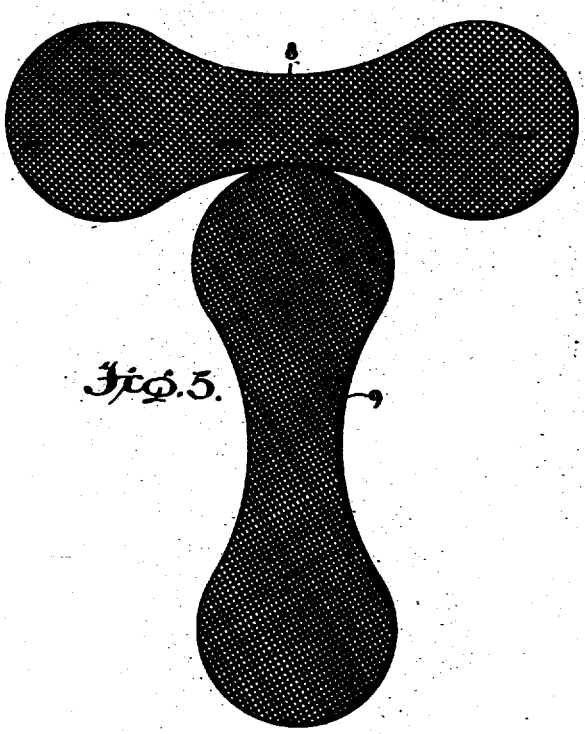
Figure 5 is a plan of the usual two-part ball cover.
Figure 6:
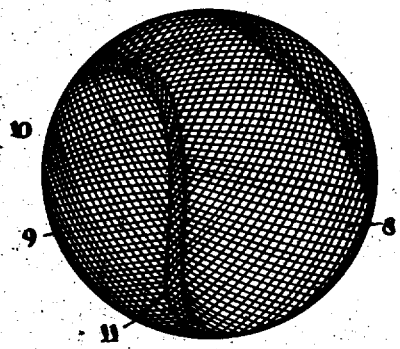
Figure 6 is a perspective view of the completed ball.

As the next step, a cover is cut from pieces of tire material. This may be cut in two pieces of the usual base ball cover form as shown at 8 and 9 in Figure 5, and, as there illustrated, it is made preferably of woven material. The cover is placed on the ball which is then put back into a mold and subjected to a second heating which acts as a final and complete cure. This operation joins the cover to the body of the ball so firmly that it will not become detached and the finished ball 10 has the appearance shown in Figure 6, the juncture lines 11 of the cover resembling seams.

The second mold should be slightly larger than the first mold because of the added thickness of the cover. The curing process is similar to that used in curing tires and can be carried out by anyone familiar with such operation.

This ball can be made in the regulation base ball size and will be nearly the regulation weight. It is very lively and will stand much more use than any base ball as at present manufactured.

What I claim is:

1. A baseball having a solid base and a rubberized fabric cover vulcanized to the base.

2. A baseball comprising a solid base of rubber and fiber and a rubberized fabric cover.

3. A baseball approximating regulation size and weight comprising a molded base and a rubberized fabric cover vulcanized to the base.

4. A process of making a baseball which comprises molding a pulp-like mass including rubber and fiber to form a core of suitable size and weight, partially curing the mass in a mold, and then applying a rubberized fabric cover to the base and vulcanizing the assembly.

5. A process of making a ball which comprises preparing a pulp-like mass from trimmings of tire stock, subjecting a quantity of said mass to a partial cure in a spherical mold to form a ball, applying a two-part cover of tire fabric to said ball, and subjecting it to a final cure in a mold, whereby the cover and body are firmly held together.

6. A process of making a ball comprising preparing a pulp-like mass composed of substantially equal parts of rubber and cotton fabric, subjecting a quantity of said mass to a partial cure in a spherical mold to form a ball, applying a two-part cover of tire fabric to said ball, and subjecting it to a final cure in a mold, whereby the cover is intimately attached to said body.

7. A process of making a ball which comprises preparing a pulp-like mass composed of rubber and fabric, subjecting a quantity of said mass to a partial cure in a mold to form a ball, applying a two-part cover of a fabric containing rubber to the ball, and subjecting it to a final cure in a mold to vulcanize the cover to the body of the ball.

8. A ball comprising a body composed of the trimmings of tire stock and a two-part cover cured thereto.

9. A ball comprising a body composed of trimmings of tire stock and a two-part cover of tire fabric vulcanized thereto.

10. A ball comprising a body composed of substantially equal parts of rubber and cotton fabric and a two-part cover cured thereto.

In witness whereof, I have hereunto signed my name.

HARRY NYE.